(12) United States Patent
Tan et al.

(10) Patent No.: US 6,188,799 B1
(45) Date of Patent: Feb. 13, 2001

(54) METHOD AND APPARATUS FOR REMOVING NOISE IN STILL AND MOVING PICTURES

(75) Inventors: Thiow Keng Tan; Sheng Mei Shen, both of Singapore (SG)

(73) Assignee: Matsushita Electric Industrial Co., Ltd., Osaka (JP)

( * ) Notice: Under 35 U.S.C. 154(b), the term of this patent shall be extended for 0 days.

(21) Appl. No.: 09/019,926

(22) Filed: Feb. 6, 1998

(30) Foreign Application Priority Data

Feb. 7, 1997 (JP) .................................................. 9-025093
Dec. 22, 1997 (JP) .................................................. 9-352977

(51) Int. Cl.[7] ...................................................... H04N 1/40
(52) U.S. Cl. ............................................ 382/260; 382/268
(58) Field of Search ..................................... 382/260–269; 358/1.9

(56) References Cited

U.S. PATENT DOCUMENTS

| 5,229,864 | * | 7/1993 | Moronaga et al. | 358/433 |
| 5,537,150 | * | 7/1996 | Sugiyama et al. | 348/558 |
| 5,563,662 | * | 10/1996 | Kishi | 348/420 |
| 5,610,729 | | 3/1997 | Nakajima | 358/463 |
| 5,933,541 | * | 8/1999 | Kutka et al. | 382/261 |

FOREIGN PATENT DOCUMENTS 9-186993   7/1997  (JP) .

* cited by examiner

*Primary Examiner*—Thomas D. Lee
*Assistant Examiner*—Stephen Brinich
(74) *Attorney, Agent, or Firm*—Wenderoth Lind & Ponack, L.L.P.

(57) ABSTRACT

A method for filtering a blocky noise, as well as ring and mosquito noise, from still and moving pictures is disclosed. The method has the steps for locating a block boundary in the picture and selecting pixels on one side of the block boundary as a first group and pixels on the other side of the block boundary as a second group, calculating mean values ($m_1$, $m_2$) and deviation ($c_1$, $c_2$) of the pixels in each of the first and second groups, detecting whether or not the deviations ($c_1$, $c_2$) are smaller than a predetermined threshold value ($T_2$), applying a first predetermined filtering (equations (5), (6)) when the deviations ($c_1$, $c_2$) are not smaller than a predetermined threshold value ($T_2$); and applying a second predetermined filtering (equations (7), (8)) when the deviations ($c_1$, $c_2$) are smaller than a predetermined threshold value ($T_2$).

11 Claims, 10 Drawing Sheets

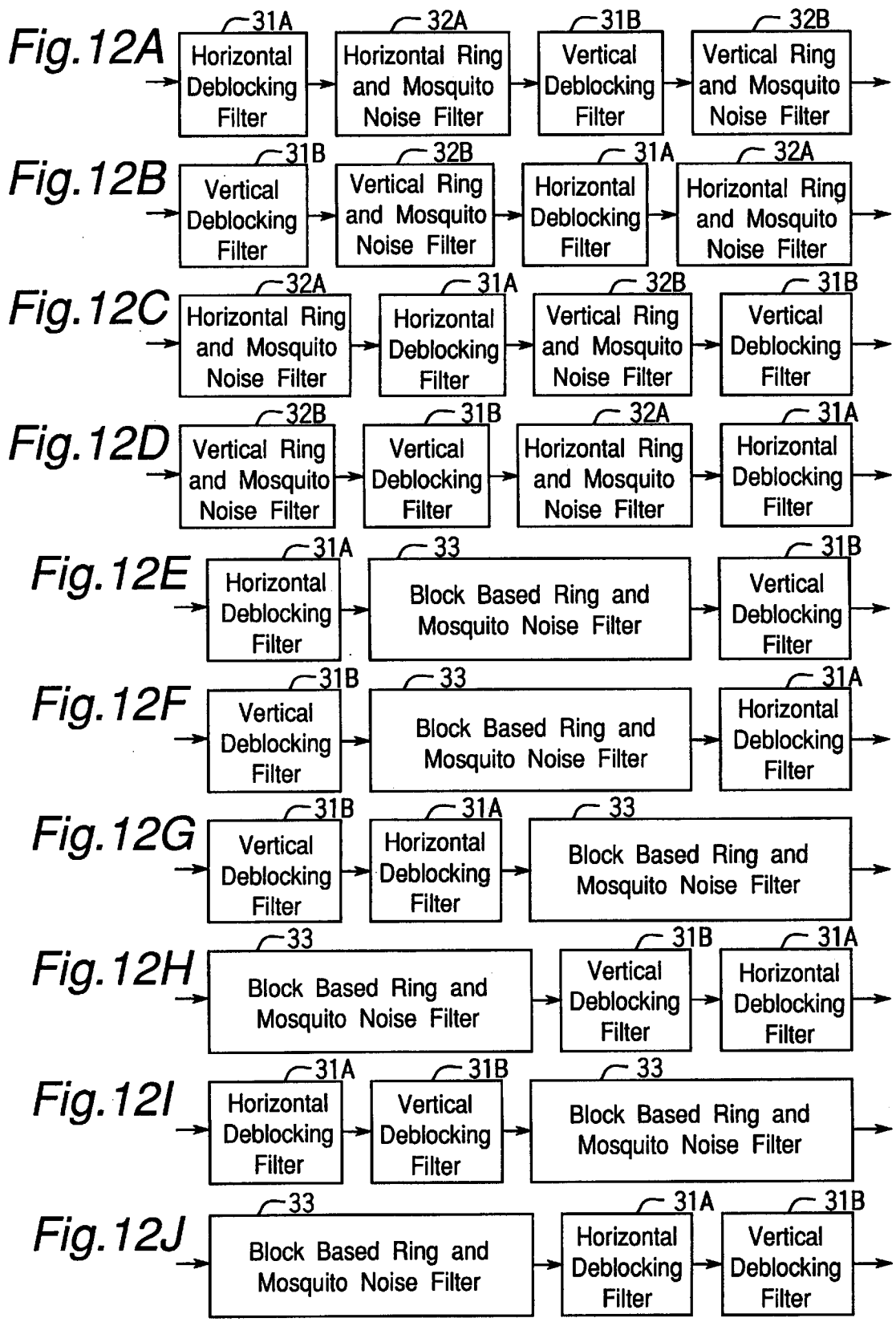

METHOD AND APPARATUS FOR REMOVING NOISE IN STILL AND MOVING PICTURES

BACKGROUND OF THE INVENTION

1. Field of the Invention

The present invention relates to a method and apparatus for removing noise in still and moving pictures, and the invention can be used in any still or moving picture compression or coding algorithm where the reconstructed picture suffers from block distortion noise commonly known as blocky noise. This method selectively filters the image such that the picture is restored and the blocky noise as well as ring and mosquito noise are removed.

2. Description of the Related Art

Many algorithms and standards exist for compression of still and moving pictures. These include standards such as the ITU-T H.261 and H.263, and the ISO standards for JPEG, MPEG-1 and MPEG-2. More recently, work has begun on the MPEG-4 video coding standard. All of the algorithms mentioned use the transform coding technique, in particular the Discrete Cosine Transform, DCT. In this technique the picture is first partitioned into small blocks of 8 pixels high and 8 pixels wide. These blocks of pixels are then transformed into the DCT domain where the transform coefficients are subjected to quantization to reduce the amount of information. At high compression ratios, most of these coefficients are quantized to zero. The quantization noise introduced during this process results in visual artifacts when the blocks of coefficients are transformed back into the pixel domain.

This artifact is a result of loss in the high frequency components of the transform coefficients. Since these coefficients are reduced to zero, the inverse quantization process cannot faithfully reproduce the original signal. The result is that the pixels at the edge of two adjacent DCT blocks have very different values. This difference in values makes the picture appear to be made up of blocks. This visual artifact is known as a blocky noise artifact. FIGS. 1A and 1B graphically depict how the blocky noise is created by coarse quantization.

FIG. 1A shows original pixel values in which pixels $P_0$, $P_1$, $P_2$, $P_3$, $P_4$, $P_5$, $P_6$ and $P_7$ have gradually increasing values. Note that a line between pixels $P_3$ and $P_4$ represent a boundary between the blocks for the DCT processing. Thus, the pixels $P_0$, $P_1$, $P_2$, and $P_3$ are processed in one DCT block, and pixels $P_4$, $P_5$, $P_6$ and $P_7$ are processed in the next neighboring DCT block. After DCT processing, the DCT coefficients are quantized. During the quantization, some data are lost. Then, after inverse DCT processing, the pixels $P_0$, $P_1$, $P_2$, and $P_3$ in the one DCT block will take different values from their original values, as shown in FIG. 1B. Similarly, the pixels $P_4$, $P_5$, $P_6$ and $P_7$ in the neighboring DCT block will take different values from their original values. In FIG. 1B, arrows added to the points representing the pixel values show the changes between before and after the DCT processing, quantization processing, and inverse DCT processing. After the inverse DCT processing, as shown in FIG. 1B, there will be a step between the pixel values $P_3$ and $P_4$, resulting in a loss of a gradual change of the pixel value at the boundary between the blocks for the DCT processing. Thus, the reproduced image will be a mosaic effect added picture.

FIGS. 2A and 2B show how the loss of high frequency coefficients in the DCT domain results in ring and mosquito noise artifacts. Note that in FIG. 2A, a dotted line between pixels $P_2$ and $P_3$ represent a discontinuity of the picture, such as an edge line of a door in the picture. After the DCT processing, quantization processing, and inverse DCT processing, the pixel values $P_2$ and $P_3$ will be further separated, as shown in FIG. 2B, resulting in a so-called, ring and mosquito noise providing undesirably emphasized edge lines in the picture.

The main problem to be solved is how to devise a general algorithm that can be applied to the picture with the artifact such that the blocky noise as well as ring and mosquito noise are reduced or removed. The goal is to manipulate the picture in such a way that the recovered picture is visually as close to the original picture as possible.

The second problem to be solved is how to prevent the blocky noise as well as ring and mosquito noise from propagating to the next frame in a sequence of moving pictures where motion compensation is used.

SUMMARY OF THE INVENTION

In order to solve the above problem, an integrated filtering technique is used. There are many filtering techniques currently being used for removing noise from pictures. What is novel about this invention is the method of adaptively deciding the pixels that are filtered and those that are not filtered as well as the values that are adaptively reset and used in the non-linear filter depending on the decisions.

To solve the propagation problem, the filter is placed within the motion compensation loop prior to the frame store so that the filtered picture is used in the motion compensation instead of the picture with artifacts. Though it is common to use a filter in the prediction loop to improve the motion compensation performance, the novelty of this invention is the use of this particular deblocking filter in the prediction loop to prevent the propagation of blocky artifacts. In prior art such as the H.261, the loop filter serves no other purpose except for improving the motion compensation prediction. In this invention the filter is not intended for the improvement of the motion compensation performance but rather for the simultaneous task of removing the blocky artifact in the current picture and also for preventing the propagation of blocky artifact into the next picture.

The current invention operates on the reconstructed still picture that is decoded from the compressed bitstream, as shown in FIG. 3. In the case of moving pictures it can operate outside the prediction loop as a post filter, shown in FIG. 4, or within the prediction loop as a loop filter, shown in FIG. 5. In all these cases the filter used is the same. It operates on the boundary of the blocks where blocky noise manifests.

The blocky noise removal filter is a separable filter and can be applied in the horizontal and vertical directions in tandem. The filter used is a modified version of the bi-linear interpolation filter. Two values of the end points are determined from the pixels on either side of the block boundary. The filtered values on either side of the filter represent the bi-linearly interpolated values of the two endpoints modified by a scaled value determined from the deviation of the actual pixel from the end points.

The ring and mosquito noise filter can be in one of two forms. The first is a block based filter where a window of pixel is conditionally averaged to remove isolated noise. This two dimensional filter can also be implemented in one dimension along the horizontal or vertical direction where the window is only one dimension along the direction of the filtering. This filter also removes the noise by conditionally averaging the pixel around the center of the window.

BRIEF DESCRIPTION OF THE DRAWINGS

FIGS. 12A, 12B, 12C, 12D, 12E, 12F, 12G, 12H, 12I and 12J are block diagrams showing various possible locations of the filter.

DESCRIPTION OF THE PREFERRED EMBODIMENTS

Figure 1A:
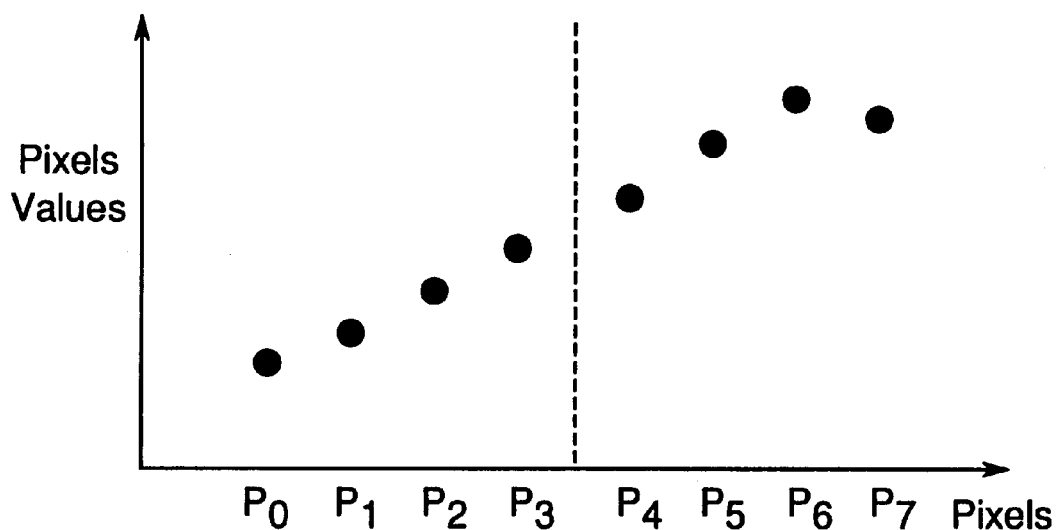
FIG. 1A is a diagram showing pixel values before the blocky noise is created.
Figure 1B:
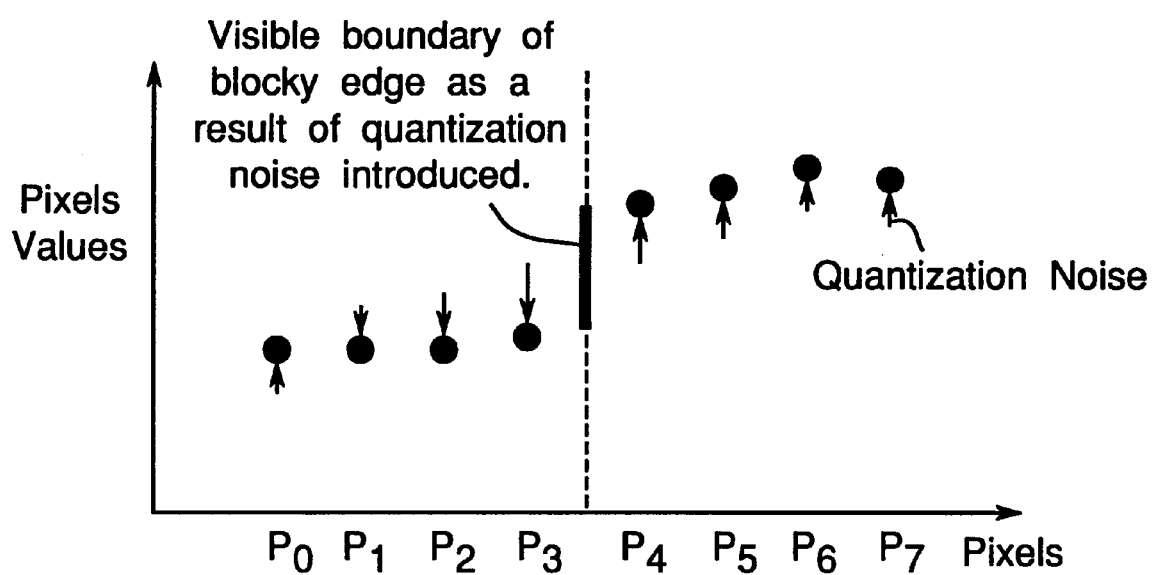
FIG. 1B is a diagram showing pixel values after the blocky noise is created.
Figure 2A:
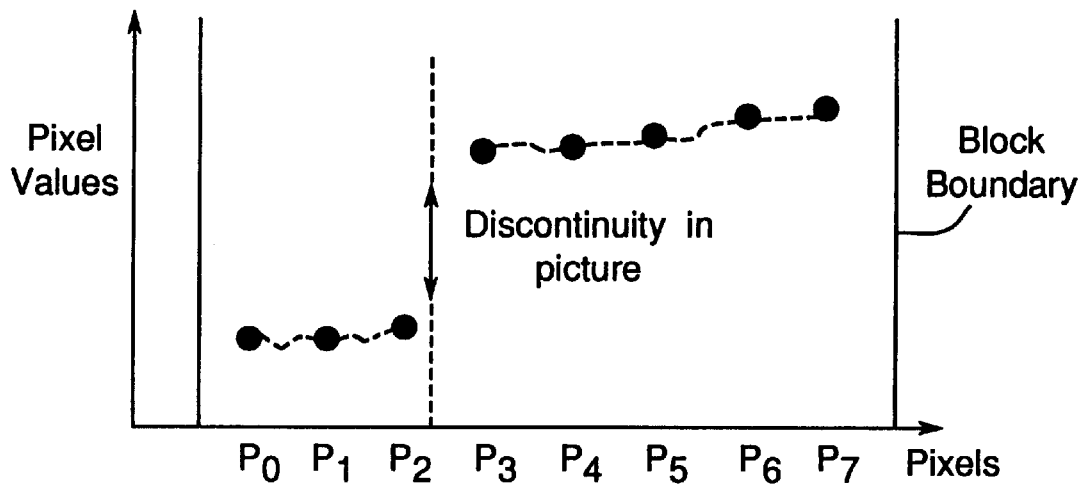
FIG. 2A is a diagram showing pixel values before the ring and mosquito noise is created.
Figure 2B:
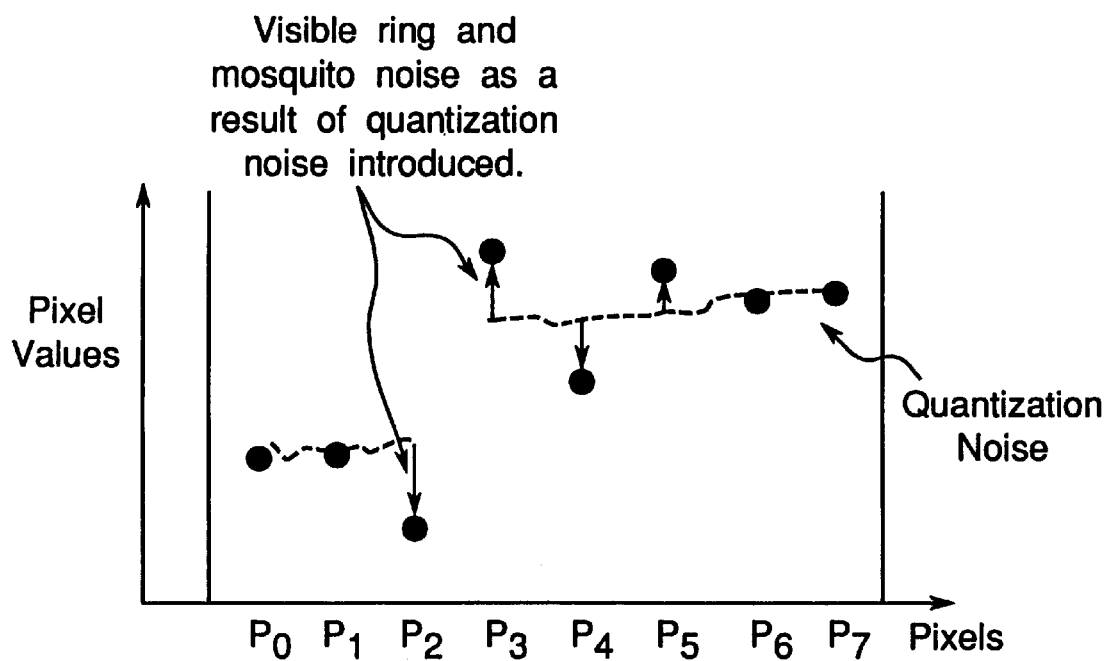
FIG. 2B is a diagram showing pixel values after the ring and mosquito noise is created.
Figure 3:
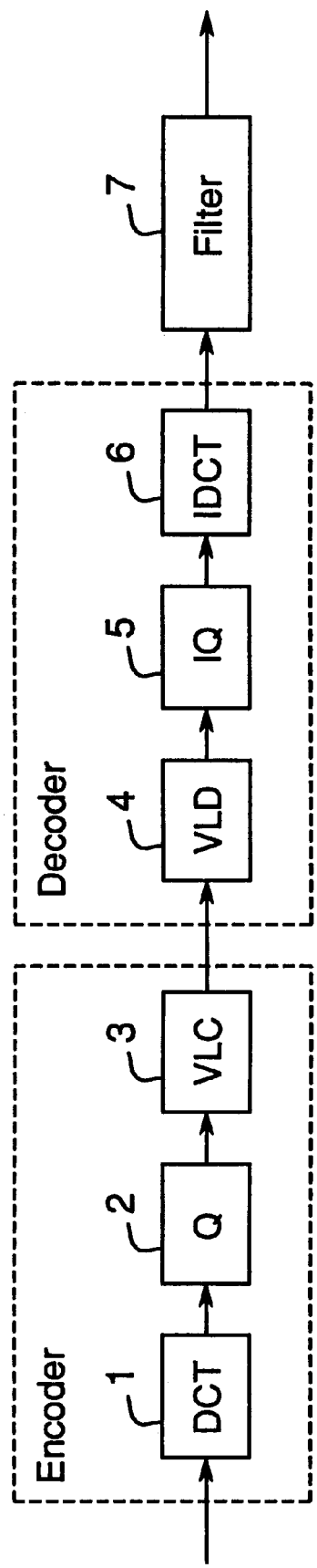
FIG. 3 is a block diagram of the encoder, decoder and filter according to the present invention.

Referring to FIG. 3, a block diagram of an encoder, a decoder and a filter 7, according to the present invention is shown, for a still picture. The encoder includes a block based discrete cosine transform 1, a quantizer 2 and a variable length coding unit 3. The decoder includes a variable length decoder 4, an inverse quantizer 5 and an inverse discrete transformer 6.

Figure 4:
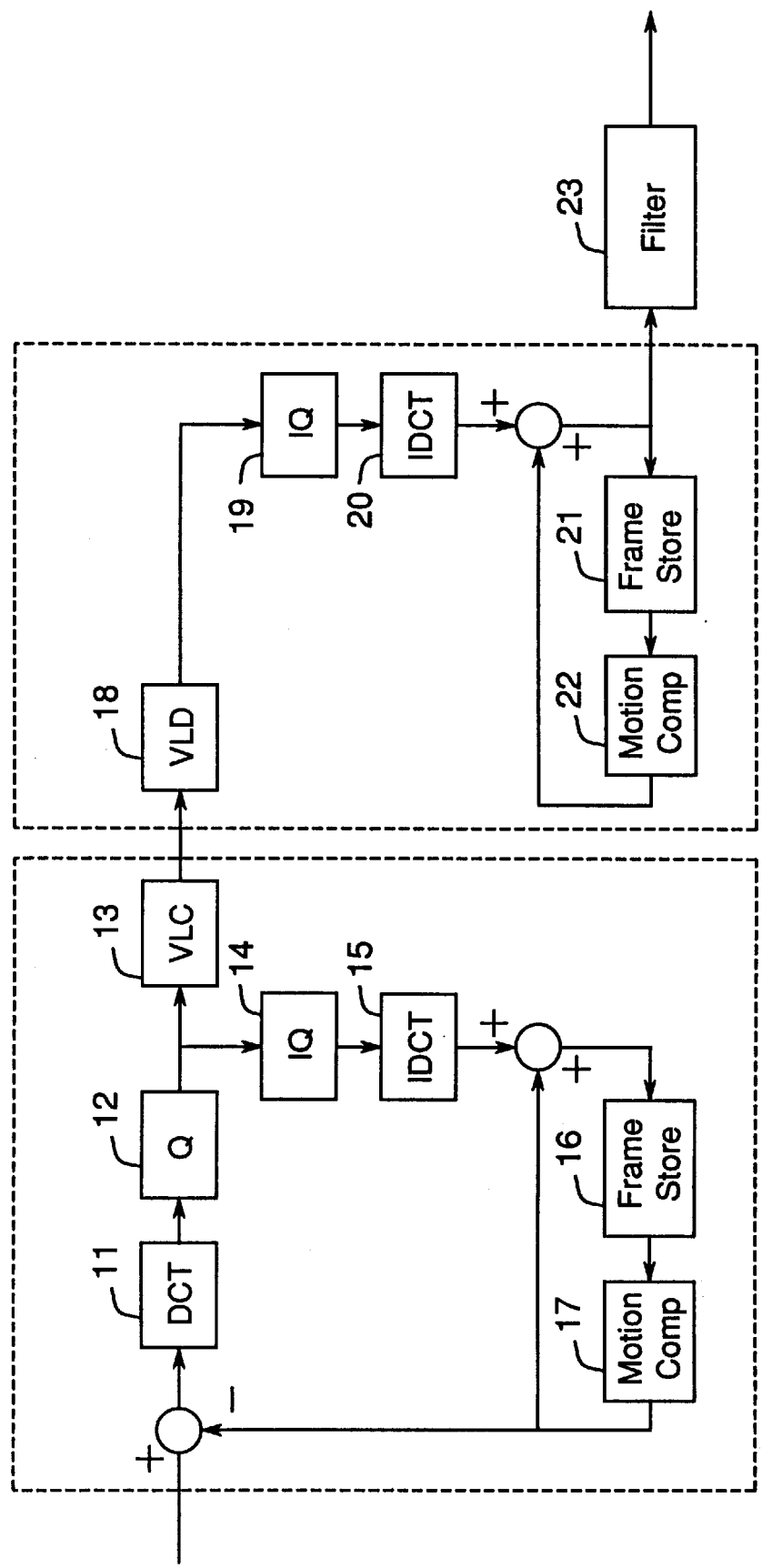
FIG. 4 is a block diagram showing a detail of the encoder and decoder and the position of the filter as a post filter in a moving picture coding scheme.

Referring to FIG. 4, a block diagram of an encoder, a decoder and a filter 23, according to the present invention is shown, for a moving picture. The encoder includes a block based discrete cosine transform 11, a quantizer 12, a variable length coding unit 13, an inverse quantizer 14, an inverse discrete transfer 15, a frame memory 16 for storing previous reconstructed picture, and a motion compensation module 17. The decoder includes a variable length decoder 18, an inverse quantizer 19, an inverse discrete transformer 20, a frame memory 21 for storing previous reconstructed picture, and a motion compensation module 22.

Figure 5:
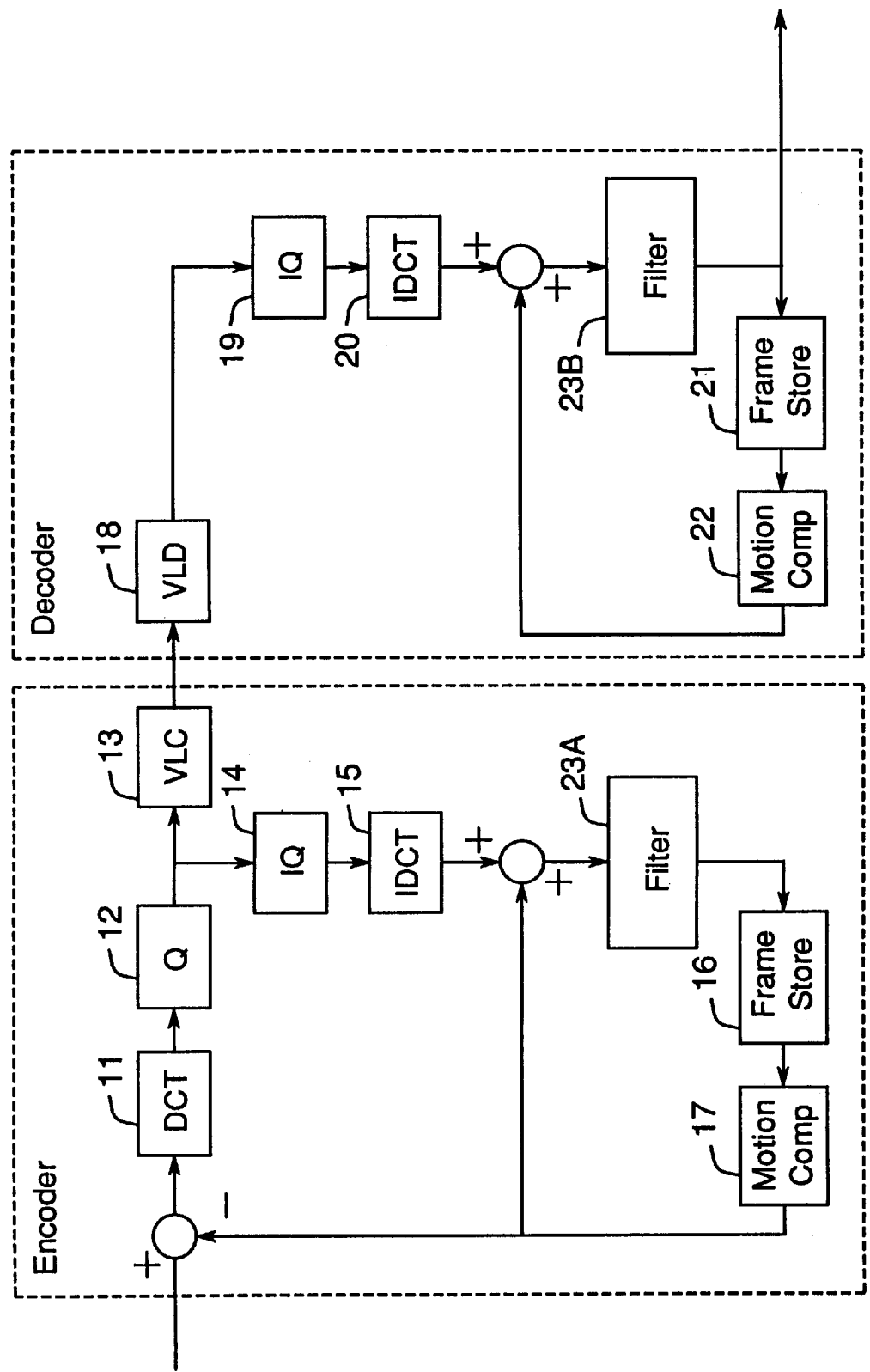
FIG. 5 is a block diagram showing a detail of the encoder and decoder and the position of the filter as a loop filter in a moving picture coding scheme.

Referring to FIG. 5, a block diagram similar to that shown in FIG. 4 is shown. In FIG. 4, filter 23, according to the present invention, is connected to the output of the decoder, but in FIG. 5, two filters 23A and 23B are provided instead. Filter 23A is provided in the encoder between an adder and the frame memory 16. Filter 23B is provided in the decoder between an adder and the frame memory 21.

The filter 7, 23, 23A or 23B, according to the first embodiment of the present invention, serves as a blocky noise filter. The function and operation of the block noise filter of the first embodiment is described below in connection with FIGS. 6, 7, 8 and 9.

The filter 7, 23, 23A or 23B, according to the second embodiment of the present invention, serves as a blocky noise and ring and mosquito noise filter. The function and operation of the block noise and ring and mosquito noise filter of the second embodiment is described below in connection with FIGS. 10, 11 and 12A–12J.

Figure 6:
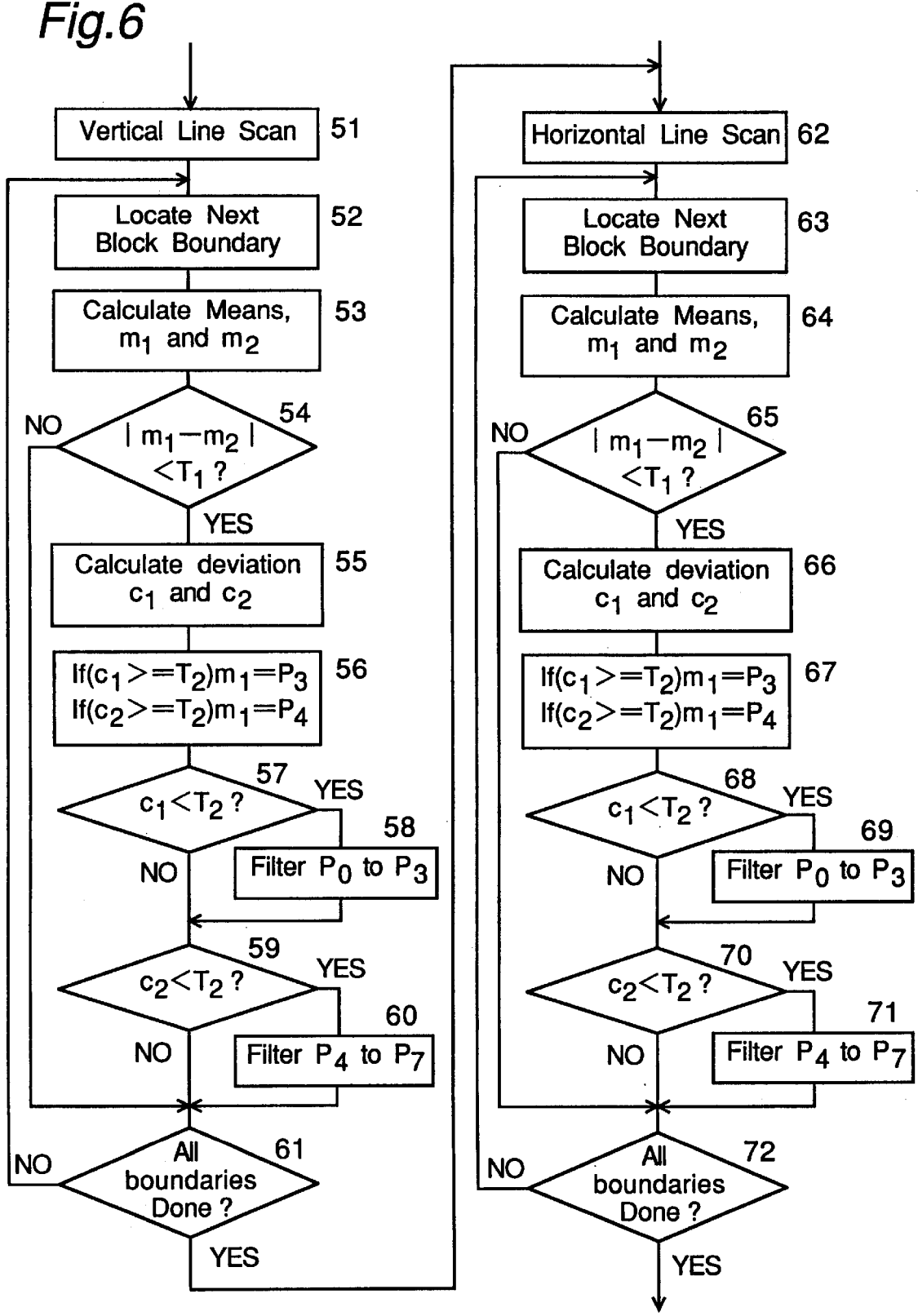
FIG. 6 is a flow chart showing an operation of the filter for removing the block noise.

Referring to FIG. 6, a flow chart of the block noise filter is shown. In FIG. 6, steps 51 to 61 are for processing pixels in vertical direction and steps 62 to 72 are for processing pixels in horizontal direction. Since the vertical direction processing and the horizontal direction processing are substantially the same, the description below is directed to the steps 62 to 72 for the horizontal direction, and the description for the vertical direction processing through steps 51 to 61 is omitted.

At step 62, a horizontal line scan starts.

Figure 7:
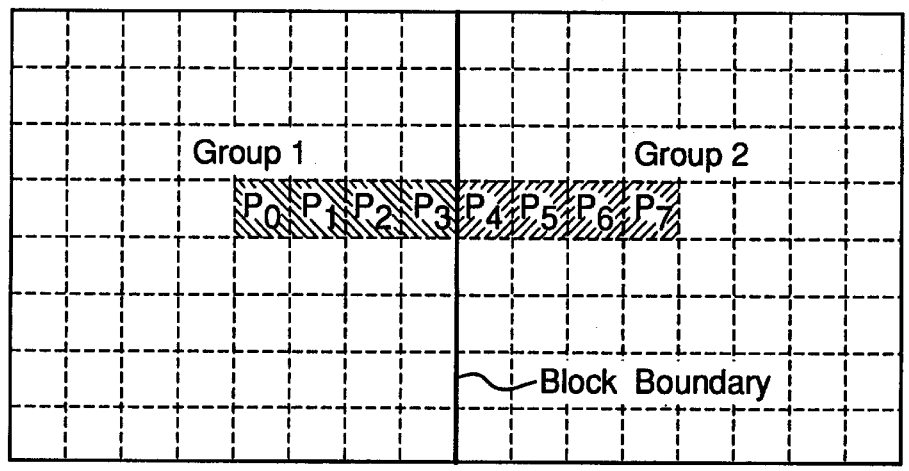
FIG. 7 is a diagram showing positions of the pixels to be processed.

At step 63, one block boundary is located, such as shown in FIG. 7. One block includes 64 (=8×8) pixels, and the block boundary between two blocks aligned side-by-side horizontally. As shown in FIG. 7, eight horizontal consecutive pixels $P_0$, $P_1$, $P_2$, $P_3$, $P_4$, $P_5$, $P_6$ and $P_7$ are taken into consideration, of which four consecutive pixels $P_0$, $P_1$, $P_2$ and $P_3$ (referred to as group 1) extend horizontally from the boundary line into the left side block and four consecutive pixels $P_4$, $P_5$, $P_6$ and $P_7$ (referred to as group 2) extend horizontally from the boundary line into the right side block. There will be eight pairs of group 1 and group 2 along one block boundary.

At step 64, The mean values, $m_1$ and $m_2$, of the pixels in group 1 and group 2, respectively, are obtained, according to equations (1) and (2), respectively.

$$m_1 = \frac{1}{4}\sum_{i=0}^{3} P_i, \text{ and} \tag{1}$$

$$m_2 = \frac{1}{4}\sum_{i=4}^{7} P_i. \tag{2}$$

At step 65, the amplitude of the difference between these mean values is compared with a predetermined threshold $T_1$ to decide if the pixels are to be filtered. If the value is greater than or equal to the threshold $T_1$, then a natural edge (a picture discontinuity such as a door edge line) has been detected and no filtering is done and the process proceed to step 72. If the value is less than the threshold $T_1$ then the process proceeds to step 66.

At step 66, two values, $c_1$ and $c_2$, equivalent to the sum of the difference between each pixel in groups 1 and 2 and its corresponding mean value $m_1$ and $m_2$, on either side of the boundary, are calculated. The mathematical equations (3) and (4) are shown below.

$$c_1 = \sum_{i=0}^{3} |P_i - m_1|, \text{ and} \tag{3}$$

$$c_2 = \sum_{i=4}^{7} |P_i - m_2|. \tag{4}$$

At step 67, these values are compared with a second threshold $T_2$. If the value $c_1$ is greater or equal to a second threshold, $T_2$, then the corresponding group of pixels are not filtered and the value $m_1$ is reset to $P_3$, the value of the pixel on the corresponding side closest to the boundary. Similarly, if the value $c_2$ is greater or equal to a second threshold, $T_2$, then the corresponding group of pixels are not filtered and the value $m_2$ is reset to $P_4$, the value of the pixel on the corresponding side closest to the boundary.

If $(c_1 \geq T_2)$ then $m_1 = P_3$, and (5)

If $(c_2 \geq T_2)$ then $m_2 = P_4$ (6)

At step 68, if $c_1$ is less than the second threshold $T_2$, step 69 is carried out for filtering the pixels in group 1 according to equation (7).

Similarly, at step 68 if $c_1$ is less than the second threshold $T_2$, step 71 is carried out for filtering the pixels in group 2 according to equation (8).

$$P'_i = \frac{(15-2i)P_i + (2i+1)P_4}{16}, \quad i = 0, 1, \ldots, 3 \quad (7)$$

$$P'_i = \frac{(15-2i)P_3 + (2i+1)P_i}{16}, \quad i = 4, 5, \ldots, 7 \quad (8)$$

Figure 8:
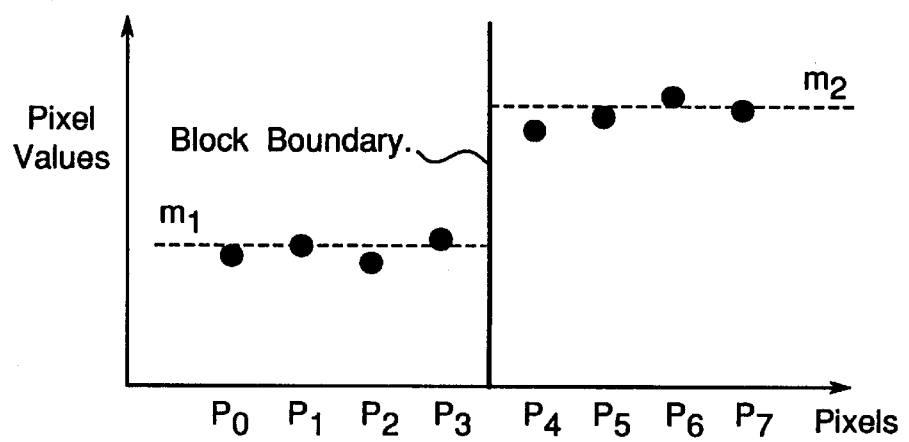
FIG. 8 is a diagram showing pixel values after the blocky noise is created.
Figure 9:
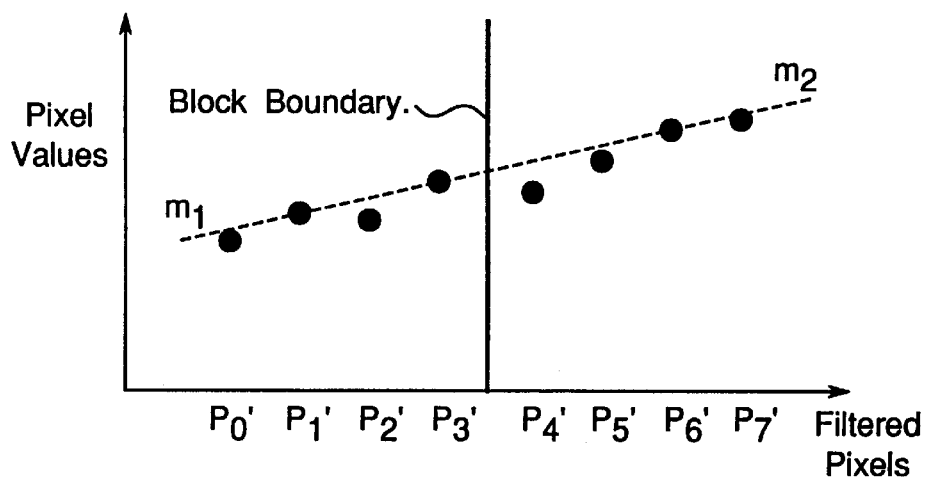
FIG. 9 is a diagram showing pixel values after the filtering is applied according to the present invention to eliminate the blocky noise.

Before the filtering according to equations (7) and (8), the pixel values may be $P_0, P_1, P_2, P_3, P_4, P_5, P_6$ and $P_7$ as shown in FIG. 8. But after the filtering according to equations (7) and (8), the pixel values may be changed to $P'_0, P'_1, P'_2, P'_3, P'_4, P'_5, P'_6$ and $P'_7$ as shown in FIG. 9.

The above is carried out for eight pairs of groups 1 and 2 in one block boundary, and the same is carried out for the next block boundary.

By the blocky noise filtering, the mosaic appearance of the picture at the block boundaries can be eliminated.

Figure 10:
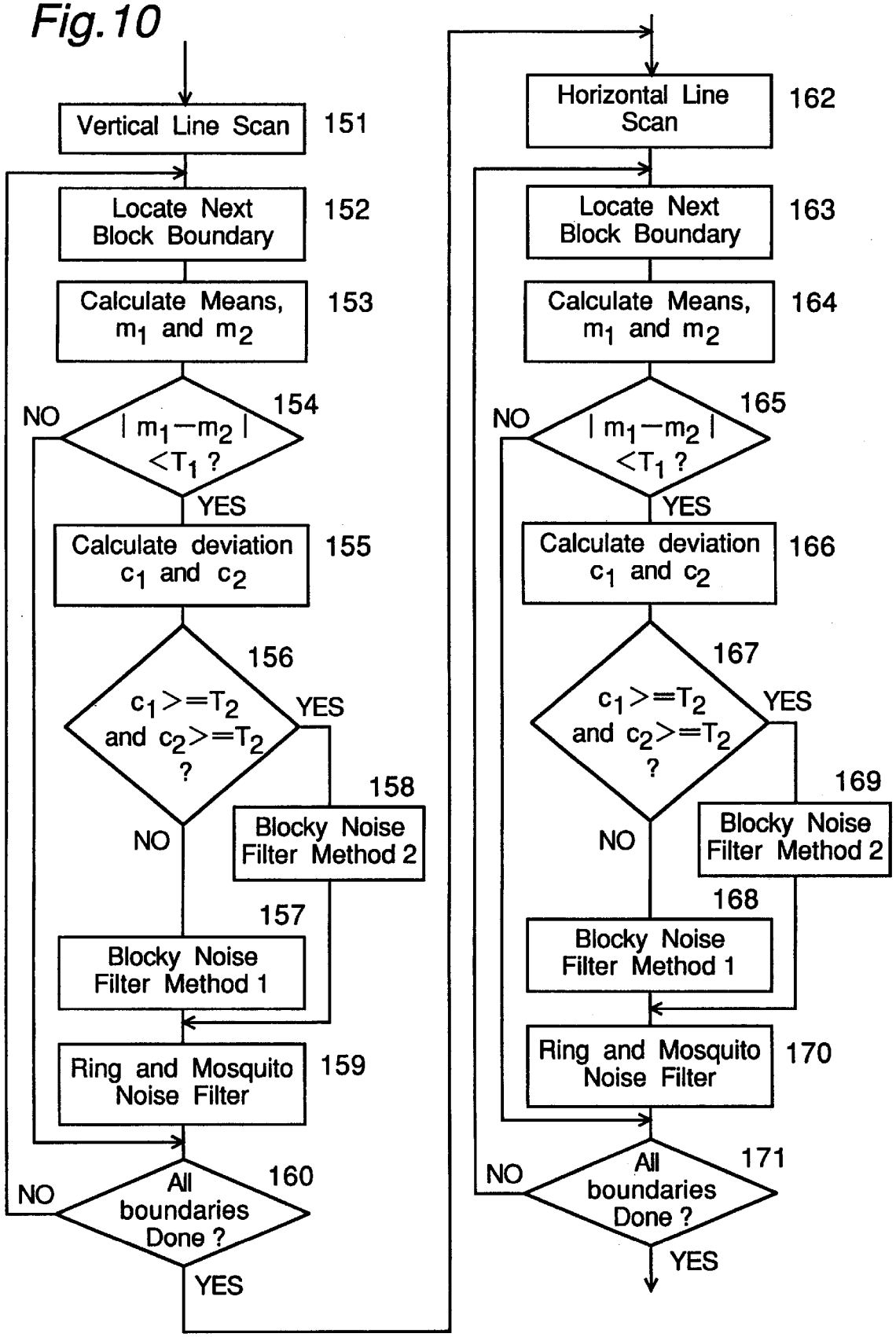
FIG. 10 is a flow chart showing an operation of the filter for removing the blocky noise and ring and mosquito noise.
Figure 11:
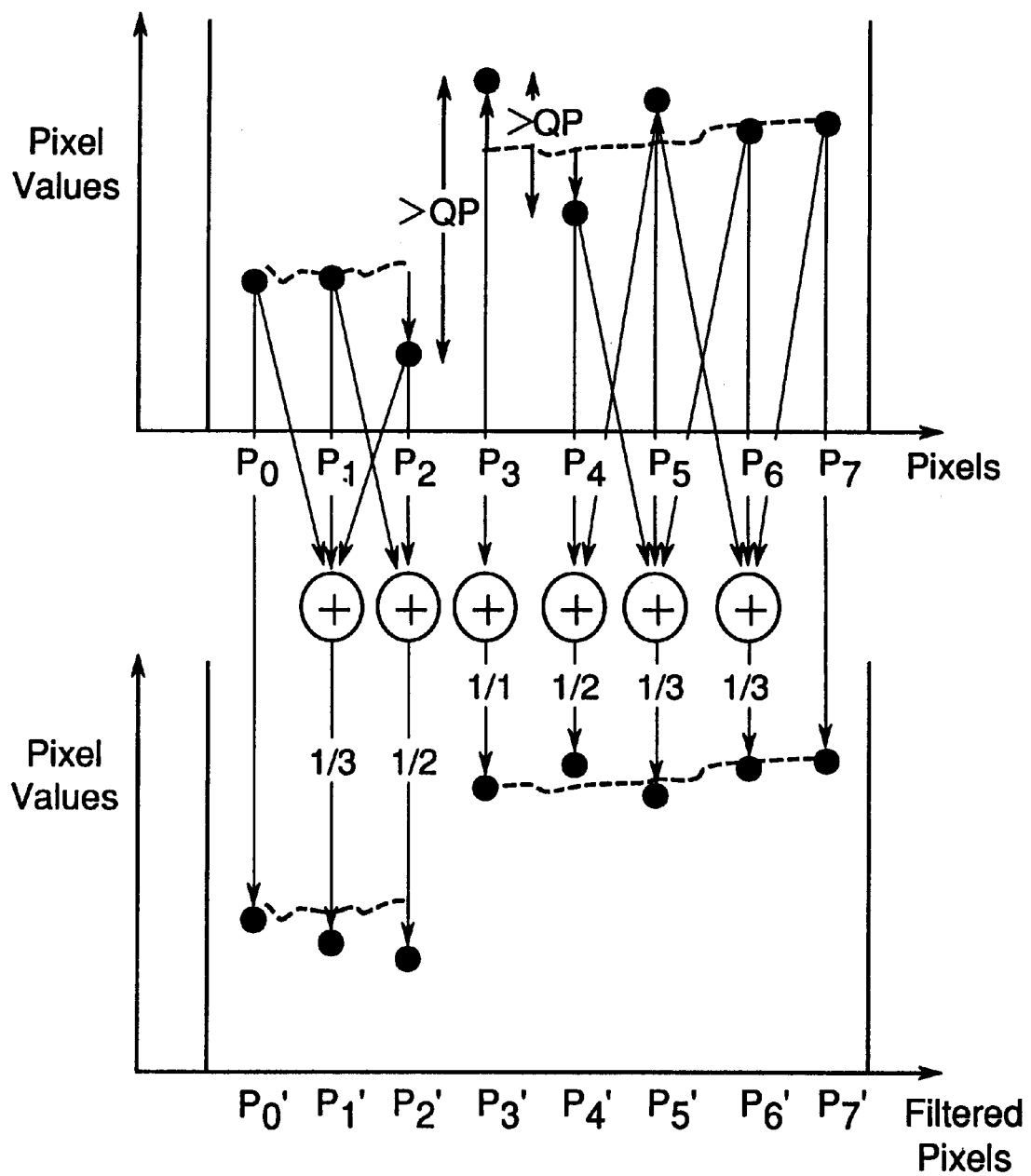
FIG. 11 are diagrams showing pixel values after the ring and mosquito noise is created and after the same is removed.

Referring to FIG. 10, a flow chart of the block noise and ring and mosquito noise filter is shown. In FIG. 10, steps 151 to 160 are for processing pixels in vertical direction and steps 162 to 71 are for processing pixels in horizontal direction. Since the vertical direction processing and the horizontal direction processing are substantially the same, the description below is directed to the steps 162 to 171 for the horizontal direction, and the description for the vertical direction processing through steps 151 to 160 is omitted.

Steps 162 to 166 are the same as step 62 to 66 described above in connection with FIG. 6, and the description therefor is omitted.

At step 167, values $c_1$ and $c_2$ are compared with a second threshold $T_2$. If the value $c_1$ is greater or equal to a second threshold $T_2$, and if the value $c_2$ is greater or equal to a second threshold, $T_2$, the procedure advances to step 169 to carry out equations (9) and (10). In this case, the boundary line matches with the some edge line in the picture. Equations (9) and (10) are modified form of the above described equations (5) and (6).

If $(c_1 \geq T_2$ or $c_1 \geq T_2)$ then $$\tilde{P}_i = \frac{P_{i-1} + 2P_i + P_{i+1}}{4}, \quad i = 3, 4, \text{ and} \quad (9)$$

$P_i = P_i$, i=0, 1, 2, 5, 6 and 7, (10)

If the value $c_1$ is less than the second threshold $T_2$, and if the value $c_2$ is less than the second threshold, $T_2$, the procedure advances to step 168 to carry out the above described equations (7) and (8). Step 168 for carrying out equations (7) and (8) and step 169 for carrying out equations (9) and (10) are for the blocky noise filtering.

At step 170, ring and mosquito noise filtering is carried out to obtain filtered pixel values $P_i'$ using equation (11). In equation (11), $\delta(\bullet)=1$, if $\bullet$ is true, and $\delta(\bullet)=0$ otherwise.

$$P'_i = \tilde{P}_i, \quad i = 0 \text{ and } 7, \text{ and} \quad (11)$$

$$P'_i = \frac{\sum_{j=i-1}^{i+1} \tilde{P}_j \cdot \delta(|\tilde{P}_i - \tilde{P}_j| < QP)}{\sum_{j=i-1}^{i+1} \delta(|\tilde{P}_i - \tilde{P}_j| < QP)}, \quad i = 1, 2, 3, \ldots, 6,$$

The effect of equation (11) is as follows. The values for the two pixels with index 0 and 7 are copied to P'. For the remaining six pixels, the filtered result, $P_i'$, are obtained by comparing the value of the neighboring pixel on either side of the current pixel, $P_i$. As show by the example of FIG. 11, if the absolute difference between the current pixel and the neighboring pixel is below the quantization step size QP, then the neighboring pixel is added to the current pixel to give the sum. The average value of the sum is then obtained to give the filtered result. Pixel $P_3$ is not used for the calculation of pixels $P'_2$ and $P'_4$ because the absolute differences were larger than QP. Similarly, pixels $P_2$ and $P_4$ are not used in the calculation of pixel $P'_3$ because the absolute differences were larger than QP.

The process then proceeds to step 171 which checks if all boundaries of the horizontal scan have been completed. If there are more boundaries in the current scan, the process is passed to step 163, and otherwise the process completes.

FIGS. 12A, 12B, 12C and 12D show block diagrams of various order combinations of horizontal deblocking filter 31A (corresponding to steps 168 and 169), horizontal ring and mosquito noise filter 32A (corresponding to step 170), vertical deblocking filter 31B (corresponding to step 157 and 158), and vertical ring and mosquito noise filter 32B (corresponding to step 159).

FIGS. 12E, 12F, 12G, 12H, 12I and 12J show block diagrams of various order combinations of horizontal deblocking filter 31A (corresponding to steps 168 and 169), block ring and mosquito noise filter 33 (corresponding to steps 159 and 170) and vertical deblocking filter 31B (corresponding to step 157 and 158).

According to the present invention, the filter removes unwanted blocky noise as well as ring and mosquito noise. When the filter is placed into the loop it further reduces the blocky noise and mosquito noise. This is because the blocky noise is removed from the reference picture and therefore is not propagated into the next picture.

What is claimed is:

1. A method for filtering a blocky noise from still and moving pictures, said method comprising:

filtering the pictures in a vertical direction and a horizontal direction, filtering in each direction comprising:

locating a block boundary in the picture and selecting pixels on one side of the block boundary as a first group and pixels on the other side of the block boundary as a second group;

calculating mean values ($m_1$, $m_2$) and deviation ($c_1$, $c_2$) of the pixels in each of the first and second groups;

detecting whether or not the deviations ($c_1$, $c_2$) are smaller than a predetermined threshold value ($T_2$);

applying a first predetermined filtering (equations (5), (6)) when the deviations ($c_1$, $c_2$) are not smaller than a predetermined threshold value ($T_2$); and applying a second predetermined filtering (equations (7), (8)) when the deviations ($c_1$, $c_2$) are smaller than a predetermined threshold value ($T_2$).

2. A method according to claim 1, wherein the block boundary in the picture is located at intervals of a plurality of pixels equal to the dimension of the block transform and each group comprises one half of the number of pixels.

3. A method according to claim 1, wherein the mean value of the group of pixels is the mathematical sum of the pixels value divided by the total number of pixels in the group.

4. A method according to claim 1, wherein the deviation of the group of pixels is the mathematical sum of the absolute difference of the pixels value and the mean value of the group.

5. A method according to claim 1, wherein a group of pixels is filtered when an absolute difference of the mean values at the block boundary is less than a predefined threshold ($T_1$).

6. A method according to claim 1, wherein, each side of the boundary, the end point is set to the value of the mean of the group of pixels on the same side, when the deviation of the group is below the predetermined threshold ($T_2$).

7. An apparatus for filtering a blocky noise from still and moving pictures, said apparatus comprising:
   at least one filter for filtering the pictures in a vertical direction and a horizontal direction, each of said at least one filter comprising:
      unit for locating a block boundary in the picture and selecting pixels on one side of the block boundary as a first group and pixels on the other side of the block boundary as a second group;
      unit for calculating mean values ($m_1$, $m_2$) and deviation ($c_1$, $c_2$) of the pixels in each of the first and second groups;
      unit for detecting whether or not the deviations ($c_1$, $c_2$) are smaller than a predetermined threshold value ($T_2$),
      unit for applying a first predetermined filtering (equations (5), (6)) when the deviations ($c_1$, $c_2$) are not smaller than a predetermined threshold value ($T_2$); and
      unit for applying a second predetermined filtering (equations (7), (8)) when the deviations ($c_1$, $c_2$) are smaller than a predetermined threshold value ($T_2$).

8. A noise removal method for removing blocky noise as well as ring and mosquito noise in still and moving pictures, said noise removal method comprising:
   locating a next block boundary in the picture and separating the pixels on either side of the block boundary into two groups;
   determining a type and length of a filter to be used based on the pixel values on either side of the block boundary; and
   applying an appropriate method of filtering to the groups of pixels;
   wherein block boundaries in the picture are located at intervals of a plurality of pixels equal to the dimension of a block transform and each group of pixels consists of up to one half of the number of pixels.

9. A noise removal method for removing blocky noise as well as ring and mosquito noise in still and moving pictures, said noise removal method comprising:
   locating a next block boundary in the picture and separating the pixels on either side of the block boundary into two groups;
   determining a type and length of a filter to be used based on the pixel values on either side of the block boundary; and
   applying an appropriate method of filtering to the groups of pixels;
   wherein said determining the type and length of filter to use comprises:
      calculating a mean value of the group of pixels, given by a mathematical sum of the pixels value divided by the total number of pixels in the group, and a deviation of the group of pixels, given by a mathematical sum of an absolute difference of the pixel value and the mean value of the group;
      checking that the absolute difference of the mean values at the block boundary is less than a first predefined threshold, proceeding with the filtering operation if the criteria is satisfied and otherwise the filtering operation ends;
      checking that the deviation of the group of pixels is less than a second predefined threshold and applying a first method of filtering if the criteria is satisfied; and applying a second of filtering, otherwise.

10. A noise removal method as claimed in claim 9, wherein the first method of filtering consists of a modified bi-linear interpolation filter wherein:
   a first end point of the bi-linear interpolation filter is a pixel value at a location of the pixel to be filtered;
   a second end point is set to a value of a pixel closest to a boundary belonging to the other group of pixels; and
   a filtered value of the pixel is a weighted sum of the two endpoints.

11. A noise removal method as claimed in claim 9, wherein the second method of filtering consists of a 3 tap low pass filter.

* * * * *